US012800487B2

(12) United States Patent
Schlemmer

(10) Patent No.: US 12,800,487 B2
(45) Date of Patent: Nov. 17, 2026

(54) SPECTROMETER AND METHOD FOR DETECTING A SPECTRUM

(71) Applicant: UNIVERSITÄT ZU KÖLN, Cologne (DE)

(72) Inventor: Stephan Schlemmer, Hürth (DE)

(73) Assignee: UNIVERSITÄT ZU KÖLN, Cologne (DE)

( * ) Notice: Subject to any disclaimer, the term of this patent is extended or adjusted under 35 U.S.C. 154(b) by 289 days.

(21) Appl. No.: 18/832,801

(22) PCT Filed: Jan. 24, 2023

(86) PCT No.: PCT/EP2023/051665
§ 371 (c)(1),
(2) Date: Jul. 24, 2024

(87) PCT Pub. No.: WO2023/139282
PCT Pub. Date: Jul. 27, 2023

(65) Prior Publication Data

US 2026/0243673 A1 Aug. 20, 2026

(30) Foreign Application Priority Data

Jan. 24, 2022 (DE) ..................... 10 2022 101 543.2

(51) Int. Cl.
*G01N 21/3586* (2014.01)
*G01J 3/02* (2006.01)
(Continued)

(52) U.S. Cl.
CPC .......... *G01N 21/3586* (2013.01); *G01J 3/027* (2013.01); *G01J 3/4338* (2013.01); (Continued)

(58) Field of Classification Search
CPC .................................................. G01N 21/3586
See application file for complete search history.

(56) References Cited

U.S. PATENT DOCUMENTS

2005/0248482 A1* 11/2005 Goodman ............. G01S 13/003
342/22
2013/0265573 A1 10/2013 Pate et al.

FOREIGN PATENT DOCUMENTS

WO WO2017120454 A1 7/2017

OTHER PUBLICATIONS

Eyal Gerecht et al., "Chirped-pulse terahertz spectroscopy for broadband trace gas sensing"; Optics Express, vol. 19, No. 9, Apr. 25, 2011, p. 8973.

(Continued)

*Primary Examiner* — Edwin C Gunberg
(74) *Attorney, Agent, or Firm* — REISING ETHINGTON, P.C.

(57) ABSTRACT

A method for detecting a spectrum of a molecular species is provided. Steps include: generating an analogue polychromatic excitation signal in a high frequency range, coupling the excitation signal into an excitation and detection apparatus to generate a background measurement signal and/or to excite the molecular species introduced into the excitation and detection apparatus, detecting the background measurement signal and/or an analogue measurement signal using the excitation and detection apparatus, generating an analogue cancellation signal taking the detected background measurement signal into account or generating the analogue cancellation signal taking the detected measurement signal into account, generating a sum signal taking the cancellation signal and the measurement signal into account, amplifying the sum signal, and detecting the spectrum of the molecular species by digitizing the amplified sum signal.

14 Claims, 3 Drawing Sheets

(51) Int. Cl.
*G01J 3/12* (2006.01)
*G01J 3/433* (2006.01)
*G01N 21/31* (2006.01)
*G01N 22/00* (2006.01)

(52) U.S. Cl.
CPC ...... *G01N 22/00* (2013.01); *G01J 2003/1286* (2013.01); *G01N 2021/3125* (2013.01); *G01N 2201/123* (2013.01); *G01N 2201/12792* (2013.01)

(56) References Cited

OTHER PUBLICATIONS

Hermanns M. et al. "Rotational spectroscopy of the two higher energy conformers of 2-cyanobutane", Journal of Molecular Spectroscopy, US, vol. 358, Nov. 17, 2018, pp. 25-36.
International Search Report for International Application No. PCT/EP2023/051665 dated Apr. 11, 2023 (4 pages).
English Translation of International Search Report for International Application No. PCT/EP2023/051665 dated Apr. 11, 2023 (2 pages).

* cited by examiner

SPECTROMETER AND METHOD FOR DETECTING A SPECTRUM

INTRODUCTION

The disclosure relates to a spectrometer for detecting a spectrum.

In addition, the disclosure relates to a method for detecting a spectrum.

High-resolution gigahertz and terahertz spectroscopy in the wavelength range from sub-millimeters to centimeters presents a number of challenges, especially in terms of sensitivity, as well as coverage of a large spectral range.

High sensitivity can be achieved by conventional absorption spectroscopy methods, in which the absorption is recorded at exactly one specific frequency. The absorption that the irradiated electromagnetic radiation undergoes at one frequency as it passes through the substance sample is measured. Larger spectral ranges can be covered by multiple measurements at different frequencies by means of a frequency sweep, which requires effort, however.

Coverage of a larger spectral range without measuring multiple different wavelengths in succession can be achieved by the method of Fourier transform spectroscopy. In this method, one measurement covers all wavelengths simultaneously as a snapshot over the entire defined frequency range. Fourier-transform spectrometers determine the spectrum based on the temporal or spatial coherence of the radiation source by recording time-dependent or location-dependent signals using Fourier transformation. Examples of Fourier-transform spectrometers are Fourier-transform infrared spectrometers, which use an interferometer to determine the IR spectrum via spatial coherence, or so-called pulse spectrometers, which use the temporal coherence of the radiation source to determine the spectrum. Pulse spectrometers excite many resonances in a spectrum simultaneously by exposing the sample to a signal pulse of a limited duration. Such a pulse contains not only the carrier frequency, but also additional frequencies. The pulse thus excites multiple frequencies at the same time, so that the process is polychromatic. In so-called Chirped Pulse Spectroscopy a temporal sequence of the instantaneous monochromatic radiation is used. The chirp excites part of the spectrum within a very short time and the decay of the coherent excitation of the sample is registered.

The scientific paper "Rotational spectroscopy of the two higher energy conformers of 2-cyanobutane" by M. Hermanns, N. Wehres, F. Lewen, H. S. P. Müller, S. Schlemmer, published in Journal of Molecular Spectroscopy 358 (2019) 25-36; DOI: 10.1016/J. JMS.2018.11.009, describes a chirped pulse spectrometer and a measurement method using the chirped pulse spectrometer. However, this has the disadvantage that the signal-to-noise ratio is low.

SUMMARY

Based on this, an object per an embodiment is to provide measures that improve the signal-to-noise ratio. In particular, a spectrometer and a method shall be provided in which a large spectral range can be excited and at the same time a high signal-to-noise ratio is achieved.

According to an embodiment, a method for detecting a spectrum of a molecular species is provided, having the steps of

- generating an analog polychromatic excitation signal in a radio frequency range,
- coupling the excitation signal into an excitation and detection device to generate a background measurement signal and/or to excite the molecular species introduced into the excitation and detection device,
- detecting the analog background measurement signal produced by the excitation and detection device and/or detecting an analog measurement signal produced by the excitation of the molecular species introduced into the excitation and detection device using the excitation and detection device,
- generating an analog cancelation signal by means of an arbitrary function generator taking into account the detected background measurement signal, or generating the analog cancelation signal by means of the arbitrary function generator taking into account the detected measurement signal, the cancelation signal being such that it is phase-shifted at least proportionally by 180 degrees with respect to a detectable analog background signal,
- generating a sum signal, taking the cancelation signal and the measurement signal into account,
- amplifying the sum signal using an amplifier, and
- detecting the spectrum of the molecular species by digitizing the amplified sum signal by means of a first analog-to-digital converter.

One aspect of the method, per an embodiment, is that the cancelation signal is generated, which is of such a form that it is phase-shifted at least proportionally by 180 degrees with respect to a detectable analog background signal. In this way, the sum signal generated by taking the cancelation signal and the measurement signal into account can preferably be maximally amplified before being digitized. This allows a spectrum of a molecular species to be detected with an improved signal-to-noise ratio, as will be explained below.

According to an embodiment, the step of generating the analog polychromatic excitation signal in the radio frequency range comprises generating an excitation signal in the form of a frequency comb. A frequency comb is a signal that has a plurality of discrete frequencies—i.e. frequencies separate from each other. In the frequency domain, the excitation signal thus preferably has the shape of a comb, the teeth of the comb being formed by multiple discrete frequency signals. The frequency peaks of the excitation signal can be arranged equidistantly, that is, each having the same frequency interval relative to adjacent frequency peaks. Alternatively, the frequency peaks of the excitation signal may also not be equidistant, so that the frequency difference between two successive frequency peaks is not equal across all frequency peaks. Due to the multiple frequency peaks, the excitation signal is therefore a polychromatic excitation signal.

The method therefore, per an embodiment, cannot preferably be described as a pulsed spectroscopy method. In contrast to the method described in the technical paper "Rotational spectroscopy of the two higher energy conformers of 2-cyanobutane", in which the polychromatic excitation signal is obtained by a short pulse—i.e. a signal that is time-limited—in this case preferably no excitation signal pulse is used. Instead, the excitation signal configured as a frequency comb allows multiple frequencies to be measured simultaneously.

The method is particularly suitable, per an embodiment, for detecting spectra in the gigahertz, terahertz, sub-millimeter and/or millimeter ranges. Preferably, it is therefore a method for detecting a spectrum of a molecular species in the gigahertz to terahertz range.

By means of the method, spectra of any type of molecular species in the given frequency range can be recorded. In the present case, a molecular species means not only a multi-atomic species, but mono-atomic species are also referred to as molecules. The method has the advantage, per an embodiment, that spectra can be easily detected with an increased signal-to-noise ratio. In particular, it is possible to dispense with a frequency sweep, in which individual frequencies are scanned sequentially. Instead, many monochromatic spectra are measured simultaneously using the frequency comb.

In one step of the method, the analog polychromatic excitation signal is generated in a radio frequency range. Radio frequency refers here to the frequency range in which the spectrum of the molecular species lies, thus preferably the gigahertz range, terahertz range, submillimeter range and/or millimeter range. Essentially, there are a number of ways to generate the polychromatic excitation signal in the radio frequency range, which will be discussed in the following. For example, the polychromatic excitation signal can be generated in the radio frequency range by means of an arbitrary function generator. Preferably, per an embodiment, the arbitrary function generator acts as a digital-to-analog converter, so that an analog excitation signal is generated.

After the excitation signal has been coupled into the excitation and detection device, the analog background measurement signal generated by the excitation and detection device is preferably detected in a subsequent step of the method. The background measurement signal corresponds to the signal generated by the excitation and detection device when no molecular species is introduced into the excitation and detection device-in other words, an empty measurement.

In principle, the empty measurement can be omitted, as will be explained below. In this case, the analog measurement signal generated by the excitation of the molecular species introduced into the excitation and detection device is detected directly by means of the excitation and detection device. Preferably, however, it is provided that the background measurement signal is detected before the measurement signal is detected.

If an empty measurement is carried out, the empty measurement signal, that is to say, the background measurement signal, is preferably used in a further step of the method to generate the cancelation signal by means of the arbitrary function generator. The analog cancelation signal is of such a form that it is at least proportionally phase-shifted by 180 degrees with respect to a detectable analog background signal. The background signal, with respect to which the cancelation signal is phase-shifted by 180 degrees, can be the background measurement signal or a signal based on the background measurement signal. If an empty measurement is performed, the cancelation signal is preferably an analog signal of such a form that it is canceled out by the background signal, wherein the background signal is either the background measurement signal or a signal based on the background measurement signal. In this case, the cancelation signal can represent the real influence of the excitation and detection device on the measurement signal.

If no empty measurement is performed, that is to say, the measurement signal is detected by means of the excitation and detection device without first detecting the background measurement signal, it is provided that the cancelation signal is generated by taking the measurement signal into account, in such a way that the cancelation signal is at least proportionally phase-shifted by 180 degrees with respect to the detectable analog background signal. In this case, the cancelation signal is a cancelation signal in which the influence of the excitation and detection device on the measurement signal is estimated.

In a further step of the method, the sum signal is then generated taking into account the cancelation signal and the detected measurement signal. Due to the characteristics of the cancelation signal, the sum signal has a greatly reduced intensity at frequencies at which the molecular species does not absorb. In other words, the characteristic of the cancelation signal results in a large number of signal components canceling each other out by the summing, and ideally only those signal components that were caused by excitation of the molecular species remaining.

The spectrum is finally detected by digitizing the amplified sum signal using the first analog-to-digital converter. In principle, analog-to-digital converters have a device-specific vertical resolution capability. By amplifying the sum signal before digitization, the signal to be detected by the first analog-to-digital converter can be matched to the resolution of the first analog-to-digital converter. Ideally, the noise of the analog sum signal is able to be detected in this way. This allows the spectrum to be detected with the best possible analog signal-to-noise ratio.

In other words, generating the cancelation signal and generating the sum signal allows the sum signal to be amplified before digitization, because it has a much lower intensity due to the cancelation signal. Thus, the signal-to-noise ratio is enhanced by the cancelation signal by the degree of cancelation.

In addition, compared to conventional absorption spectroscopy, the method has the advantage that no frequency sweep is necessary to cover a large frequency range. Instead, the polychromatic excitation signal has multiple frequencies. Furthermore, compared to conventional absorption spectroscopy, the method also has the advantage that the phase-sensitive electric field can be detected instead of the total power of the signal. The total power is proportional to the square of the electric field, so that the signal-to-noise ratio increases more rapidly in the present method.

As already explained, in an alternative form of the method, the cancelation signal can be generated by taking into account the detected background measurement signal—i.e. an empty measurement can be carried out before the measurement of the spectrum of the molecular species. In this context, according to a preferred development per an embodiment it is provided that the step of generating the analog cancelation signal by means of the arbitrary function generator, taking into account the detected background measurement signal, comprises the steps of

- amplifying the analog background measurement signal detected by the excitation and detection device by means of an amplifier, and
- digitizing the background measurement signal amplified by the amplifier by means of a second analog-to-digital converter,
- and wherein the analog cancelation signal is phase-shifted by 180 degrees with respect to the analog background measurement signal detected by the excitation and detection device.

It is therefore preferably provided, per an embodiment, in the case of an empty measurement that the back-ground measurement signal is amplified and digitized by the second analog-to-digital converter and this digitized signal is used to generate the analog cancelation signal by means of the arbitrary function generator. The same background measurement signal (or intermediate frequency background signal, see comments below) is preferably used to determine the intensity of the illumination of the sample. This is relevant for the determination of the molecular absorption. As already mentioned, the arbitrary function generator preferably acts as a digital-to-analog converter, so that the analog cancelation signal is generated on the basis of the amplified and digitized background measurement signal.

If no empty measurement is performed, according to a further embodiment it is provided that the step of generating the analog cancelation signal by means of the arbitrary function generator, taking into account the detected measurement signal, comprises the steps of amplifying the analog measurement signal detected by the excitation and detection device by means of an amplifier, digitizing the measurement signal amplified by the amplifier by means of a second analog-to-digital converter, and identifying background regions in the digitized measurement signal, and wherein the analog cancelation signal is phase-shifted by 180 degrees, at least in the regions of the analog background measurement signal, which can be detected by the excitation and detection device, corresponding to the background regions.

In this alternative also, the measurement signal is thus amplified and digitized by the second analog-to-digital converter and this digitized signal is used to generate the analog cancelation signal by means of the arbitrary function generator. However, since this is a cancelation signal based on the measurement signal, this alternative also includes the step of identifying the background regions in the digitized measurement signal. It is therefore preferably provided, per an embodiment, that those frequency ranges of the digitized measurement signal in which no absorption by the molecular species takes place, are used as a basis to determine the cancelation signal for all frequency ranges.

Irrespective of whether an empty measurement is carried out or not, according to a further embodiment it is provided that the step of generating the sum signal, taking into account the cancelation signal and the measurement signal, comprises summing the cancelation signal with the analog measurement signal detected by the excitation and detection device. In other words, two analog signals—namely the measurement signal and the cancelation signal—are summed directly to generate the sum signal.

As mentioned above, there are several ways to generate the polychromatic excitation signal in the frequency range of the radio frequency, wherein, for example, the polychromatic excitation signal in the frequency range of the radio frequency can be generated by means of the arbitrary function generator. However, it may be the case that the arbitrary function generator is not suitable for generating the excitation signal in high frequency ranges of the radio frequency. In this context, according to an embodiment, the step of generating the analog polychromatic excitation signal in the radio frequency range comprises the steps of generating a polychromatic input signal by means of the arbitrary function generator, and generating the analog polychromatic excitation signal by up-mixing the input signal by means of an up-converting mixer with a first local oscillator having a first local oscillator frequency, and wherein the polychromatic excitation signal in the radio frequency range comprises a lower sideband and an upper sideband, which are centered around the first local oscillator frequency.

In other words, it is preferably provided, per an embodiment, that the frequencies of the high frequency are generated by the up-converting mixer based on the input signal generated by the arbitrary function generator. In other words, with regard to the generation of the excitation signal it is therefore provided, per an embodiment, that in a first step of the method, the polychromatic input signal is generated by means of the arbitrary function generator. For this purpose, the spectrometer comprises the arbitrary function generator, which is designed to generate the polychromatic input signal. The frequencies of the input signal are also referred to as the first intermediate frequency.

The excitation signal is preferably, per an embodiment, then generated by up-mixing the input signal with the first local oscillator having the first local oscillator frequency by means of the up-converting mixer. By means of mixers, a signal in a specific frequency band with a defined bandwidth can be converted into a higher (up-mixing) or lower (down-mixing) frequency band. In addition to the mixing stage, the local oscillator that has a frequency that determines a center frequency of the mixture is used for the frequency conversion.

Preferably, per an embodiment, the local oscillator of the up-converting mixer, that is, the first local oscillator, has a frequency between 0 to 4 GHz, more preferably between 0 and 500 MHz.

In this regard, according to a further embodiment it is provided that the step of generating the polychromatic input signal by means of the arbitrary function generator comprises generating an input signal in the form of a frequency comb in the frequency range of a first intermediate frequency. In other words, it is therefore preferably provided, per an embodiment, that the input signal comprises a frequency comb in the frequency range of the first intermediate frequency. In the frequency domain, the input signal thus preferably has the shape of a comb, wherein the teeth of the comb are formed by multiple discrete frequency signals. The frequency peaks of the input signal can be arranged equidistantly, that is, each having the same frequency interval relative to adjacent frequency peaks. Alternatively, the frequency peaks of the input signal may also not be equidistant, so that the frequency difference between two successive frequency peaks is not equal across all frequency peaks.

With regard to up-mixing, it is further preferred, per an embodiment, that the step of generating the excitation signal by up-mixing the input signal with the first local oscillator comprises generating the excitation signal with the lower sideband and the upper sideband in the radio frequency range, wherein the lower and upper sidebands are centered around the first local oscillator frequency. In other words, it is therefore preferably provided, per an embodiment, that the excitation signal comprises the lower sideband and upper sideband centered around the first local oscillator frequency in the radio frequency range. In the frequency domain, the excitation signal thus preferably comprises the two sidebands centered around the first local oscillator frequency.

In the event that the polychromatic excitation signal is generated in the frequency range of the radio frequency by means of the up-converting mixer, it is further preferably provided, per an embodiment, that the step of generating the cancelation signal is also modified by carrying out an additional down-mixing operation.

Preferably, per an embodiment, after the excitation signal generated by up-mixing has been coupled into the excitation and detection device, the measurement signal generated by the excitation and detection device is detected in a subsequent step of the method and then down-mixed by means of a down-converting mixer. In other words, an intermediate frequency signal is preferably generated by down-mixing the measurement signal with a local oscillator of the down-converting mixer.

As previously stated, an empty measurement can either be performed or not. In the case of an empty measurement, in connection with the down-mixing, according to an embodiment, it is provided that the step of generating the analog cancelation signal by means of the arbitrary function generator, taking into account the detected back-ground measurement signal, comprises the steps of

- generating an intermediate frequency background signal by down-mixing the analog background measurement signal detected by the excitation and detection device by means of a down-converting mixer with a second local oscillator having a second local oscillator frequency,
- amplifying the generated intermediate frequency background signal by means of an amplifier, and
- digitizing the intermediate frequency background signal amplified by the amplifier by means of a second analog-to-digital converter, and wherein the analog cancelation signal is phase-shifted by 180 degrees with respect to the intermediate frequency background signal generated by the down-converting mixer.

In the case of up- and down-mixing and an empty measurement being carried out, in other words it is therefore preferably provided, per an embodiment, that the cancelation signal is preferably an analog signal, which is of such a form that it is canceled out by the intermediate frequency background signal based on the background measurement signal.

In the event that the polychromatic excitation signal is generated in the radio frequency range by means of the up-converting mixer and no empty measurement is carried out, it is provided according to an embodiment that the step of generating the analog cancelation signal by means of the arbitrary function generator, taking into account the detected measurement signal, comprises the steps of

- generating an intermediate frequency measurement signal by down-mixing the analog background measurement signal detected by the excitation and detection device by means of a down-converting mixer with a second local oscillator having a second local oscillator frequency,
- amplifying the generated intermediate frequency measurement signal by means of an amplifier,
- digitizing the intermediate frequency measurement signal amplified by the amplifier by means of a first analog-to-digital converter, and
- identifying background regions in the digitized intermediate frequency measurement signal, and wherein the analog cancelation signal is phase-shifted by 180 degrees, at least in the regions of the intermediate frequency background signal, which can be generated by the down-converting mixer, corresponding to the background regions.

In other words, in the case of up- and down-mixing with no empty measurement being carried out, it is therefore preferably provided, per an embodiment, that the cancelation signal is preferably an analog signal, which is of such a form that it is canceled out at least by the regions of the intermediate frequency background signal that can be generated that correspond to the background regions.

With regard to the up- and down-mixing and regardless of whether an empty measurement is carried out or not, it is also provided according to an embodiment that a different local oscillator frequency is used for the up-mixing and the down-mixing. In other words then, the local oscillator of the up-converting mixer, which is also referred to as the first local oscillator, has a different local oscillator frequency from the local oscillator frequency of the down-converting mixer, which is also referred to as the second local oscillator. In this way, the two sidebands do not coincide during the down-mixing and both can be detected. This procedure therefore results in the spectral range covered by both side bands being measured.

The local oscillator of the down-converting mixer, that is, the second local oscillator, preferably per an embodiment has a frequency of 0 to 3 THz. As mentioned above, the local oscillator frequency of the second local oscillator is different from the local oscillator frequency of the first local oscillator. It is preferably provided, per an embodiment, that the local oscillator frequency of the first local oscillator deviates by at least 100 kHz from the local oscillator frequency of the second local oscillator. It is preferably provided, per an embodiment, that the local oscillator frequency of the first local oscillator deviates by no more than 1 MHz from the local oscillator frequency of the second local oscillator.

With respect to the down-mixing, according to an embodiment it is provided that the step of generating the intermediate frequency signal by down-mixing the measurement signal with the second local oscillator, comprises generating the inter-mediate frequency signal in a frequency range of a second intermediate frequency by interlacing the lower and upper side bands. Due to the different frequencies of the first and second local oscillator, the down-mixing of the measurement signal leads to the intermediate frequency signal being formed in the frequency range of the second intermediate frequency by interlacing the lower and upper sidebands of the excitation signal. If the frequencies of the first and second local oscillators were identical to each other, the individual frequency peaks of the upper and lower sidebands of the frequency comb would be aligned with one another after the down-mixing, if the measurement signal were identical to the excitation signal. Due to the different frequencies of the first and second local oscillator, however, an offset is also produced even with identical measurement and excitation signals, so that in the case of equidistant frequency peaks, the individual frequency peaks of the upper and lower sidebands of the frequency comb alternate in the intermediate frequency signal after the down-mixing.

As just explained, it is therefore preferably provided, per an embodiment, with respect to the method that the step of generating the excitation signal by up-mixing the input signal with the first local oscillator comprises generating the excitation signal with the lower sideband and upper sideband centered around the first local oscillator frequency in the frequency range of the radio frequency, and that the step of generating the intermediate frequency signal by down-mixing the measurement signal with the second local oscillator, comprises generating the intermediate frequency signal in the frequency range of the second intermediate frequency by interlacing the lower and upper sideband.

With regard to the up- and down-mixing and regardless of whether an empty measurement is carried out or not, it is also provided according to an embodiment that the step of generating the sum signal, taking into account the cancelation signal and the measurement signal, comprises summing the cancelation signal with the intermediate frequency measurement signal generated by the down-converting mixer. Thus, while in the case in which no mixers are used, the sum signal is preferably generated, per an embodiment, by summing the cancelation signal with the measured signal detected by the excitation and detection device, in the case of up- and down-mixing, the sum signal is preferably generated by summing the cancelation signal with the intermediate frequency measurement signal generated by the down-converting mixer.

Regardless of whether an up-mixing or down-mixing takes place, and regardless of whether an empty measurement is carried out or the cancelation signal is determined by taking the measurement signal into account, according to an embodiment it is provided that the step of digitizing by means of the second analog-to-digital converter takes place within a time interval of less than $2/(\Delta f)$ by means of the second analog-to-digital converter. The second analog-to-digital converter provides the signal on the basis of which the cancelation signal is generated. In relation to the time interval, $\Delta f$ stands for the desired frequency resolution of the spectrum of the molecular species, and is preferably a few kHz. In other words, the digitization of the amplified background measurement signal (without mixer, with empty measurement), of the amplified measurement signal (without mixer, without empty measurement), of the amplified intermediate frequency background signal (with mixer, with empty measurement), and/or of the amplified intermediate frequency measurement signal (with mixer, without empty measurement) is a fast process, preferably completed within about 1 ms. This allows the cancelation signal to be generated in the shortest possible time.

The method also allows the frequency modulation technique to be used. In this context, according to an embodiment, it is provided that the step of generating the analog polychromatic excitation signal in the radio frequency range comprises generating an excitation signal in the form of a frequency comb, wherein each peak of the frequency comb is modulated with a separate modulation frequency, and wherein the step of detecting the spectrum of the molecular species by digitizing the amplified sum signal by means of the first analog-to-digital converter comprises detecting the spectrum of the molecular species by demodulating the amplified sum signal and digitizing the demodulated signal.

By modulating each frequency peak with its own modulation frequency, the entire spectrum can be extracted from the sum signal, or preferably from the amplified sum signal, by demodulation. Such a demodulated spectrum corresponds to a conventional frequency-modulated spectrum, which is determined by scanning over the individual frequencies (frequency sweep) and which is acquired during digitization by means of an AC input coupling. However, in the present method, per an embodiment, each frequency does not have to be scanned individually and the AC input coupling can also be dispensed with due to the principle of signal cancelation by means of the cancelation signal.

According to an embodiment, a spectrometer for detecting a spectrum of a molecular species is also provided, comprising an excitation and detection device, wherein the excitation and detection device is designed to couple an excitation signal into the excitation and detection device and to detect an analog background measurement signal and/or analog measurement signal, an arbitrary function generator, wherein the arbitrary function generator is designed to generate an analog cancelation signal, taking into account the detected background measurement signal or measurement signal, a first analog-to-digital converter for generating the spectrum of the molecular species, and a second analog-to-digital converter.

According to a first alternative, the arbitrary function generator is designed to generate the excitation signal, the second analog-to-digital converter is designed to receive the measurement signal and/or background measurement signal, and the spectrometer is designed in such a way that the analog cancelation signal is phase-shifted by 180 degrees with respect to the analog background measurement signal detected by the excitation and detection device.

According to a second alternative, the spectrometer comprises an up-converting mixer with a first local oscillator having a first local oscillator frequency and a down-converting mixer with a second local oscillator having a second local oscillator frequency different from the first local oscillator frequency. Furthermore, the arbitrary function generator is designed to generate an input signal, the up-converting mixer is designed to generate the excitation signal from the input signal, the down-converting mixer is designed to generate an intermediate frequency background signal from the detected analog background measurement signal and to generate an intermediate frequency measurement signal from the detected analog measurement signal, the second analog-to-digital converter is designed to receive the intermediate frequency measurement signal and/or intermediate frequency background signal, and the spectrometer is configured in such a way that the analog cancelation signal is phase-shifted by 180 degrees with respect to the intermediate frequency background signal generated by the down-converting mixer.

In contrast to the spectrometer described in the technical paper "Rotational spectroscopy of the two higher energy conformers of 2-cyanobutane", in the present case and per an embodiment, in the spectrometer according to the second alternative the local oscillator of the up-converting mixer has a different local oscillator frequency from the local oscillator frequency of the down-converting mixer. In other words, the local oscillator of the up-converting mixer and the local oscillator of the down-converting mixer do not have the same local oscillator frequency.

The spectrometer is particularly suitable for detecting spectra in the gigahertz, terahertz, submillimeter and/or millimeter ranges. It is therefore preferably a gigahertz to terahertz spectrometer. Preferably, the method described above for detecting a spectrum can be carried out by means of the spectrometer.

In the first alternative, the spectrometer uses the arbitrary function generator to generate the excitation signal. In the second alternative, the spectrometer has the up-converting mixer for generating the excitation signal and the down-converting mixer for generating the intermediate frequency signal. Preferably, the up-converting mixer and/or the down-converting mixer is/are a multiplicative mixer.

For coupling in the excitation signal and for detecting the measurement signal, the spectrometer comprises the excitation and detection device. The excitation and detection device can be formed, for example, from a sample chamber for providing the molecular species and two antennas for coupling in the excitation signal and detecting the measurement signal. The sample chamber is further preferably designed to allow gaseous molecular species to be introduced into the sample chamber and removed from the sample chamber.

The arbitrary function generator is preferably designed not only to generate the input signal or the excitation signal, but preferably also designed to generate the cancelation signal.

According to an embodiment, the spectrometer in the first alternative is designed in such a way that for detecting the spectrum, a sum signal can be generated from the cancelation signal and the analog measurement signal, wherein after amplification by means of an amplifier the sum signal can be digitized by the first analog-to-digital converter.

According to an embodiment, the spectrometer in the second alternative is designed in such a way that for detecting the spectrum, a sum signal can be generated from the cancelation signal and the intermediate frequency signal, wherein after amplification by means of an amplifier the sum signal can be digitized by the first analog-to-digital converter.

In other words, it is preferably provided, per an embodiment, that the amplifier has inputs for the cancelation signal and the measurement signal (first alternative) or inputs for the cancelation signal and the intermediate frequency signal (second alternative) and is designed to sum the cancelation signal and the measurement signal, or the cancelation signal and the intermediate frequency signal, and/or that the amplifier has an input for the sum signal. In addition, it is preferably provided, per an embodiment, that the output of the amplifier is connected to the first analog-to-digital converter.

With regard to the demodulation, according to an embodiment it is provided that the spectrometer comprises a demodulator and is designed in such a way that to detect the spectrum, a sum signal can be generated from the cancelation signal and the intermediate frequency signal or from the cancelation signal and the analog measurement signal, and that the sum signal can be demodulated by the demodulator after amplification by means of an amplifier. In other words, it is therefore preferably provided, per an embodiment, that the demodulator is interposed between the amplifier and the first analog-to-digital converter. Alternatively, it may be provided that the demodulator is connected downstream of the analog-to-digital converter and the signal digitized by the first analog-to-digital converter is demodulated.

Further technical features and advantages of the spectrometer will be apparent to a person skilled in the art from the description of the method for detecting the spectrum.

BRIEF DESCRIPTION OF THE FIGURES

In the following, the invention is described in greater detail with reference to the drawing based on preferred exemplary embodiments.

In the Drawings

DETAILED DESCRIPTION

Figure 1:
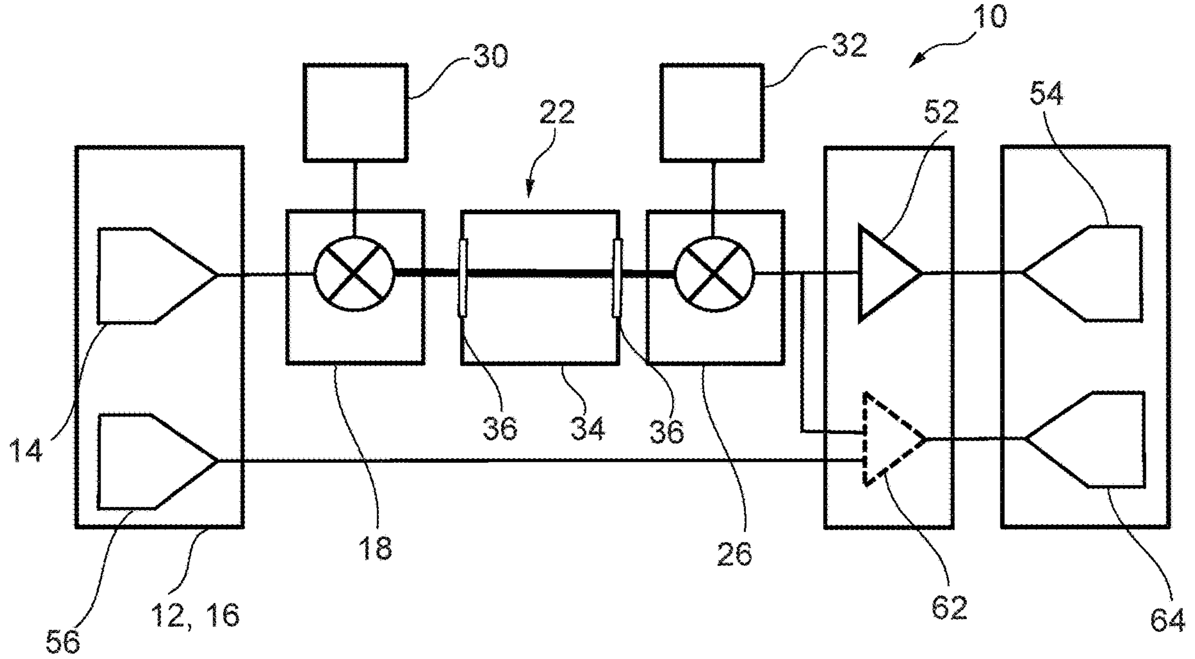
FIG. 1 shows a schematic representation of a spectrometer for detecting a spectrum, according to an embodiment.

FIG. 1 shows a schematic representation of a spectrometer 10 for detecting a spectrum 58, 60 (see FIG. 4 or 5), according to an embodiment. The spectrometer 10 comprises in this case an arbitrary function generator 12 for generating an input signal 14. The arbitrary generator 12 also functions directly as a digital-to-analog converter 16, so that the input signal 14 is an analog signal.

Figure 2:
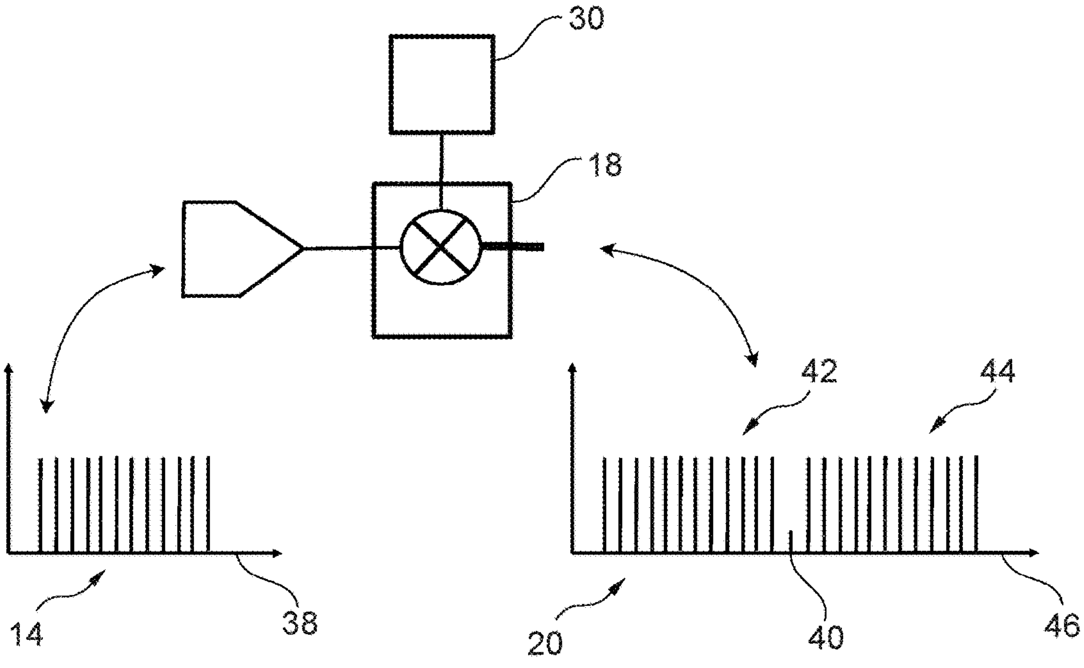
FIG. 2 shows a schematic representation of the process of up-mixing when carrying out a method for detecting a spectrum by means of the spectrometer from FIG. 1.

Furthermore, the spectrometer 10 comprises an up-converting mixer 18 for generating an excitation signal 20 based on the input signal 14. The input signal 14 and the excitation signal 20 are not shown in FIG. 1, but are shown in FIG. 2.

Figure 3:
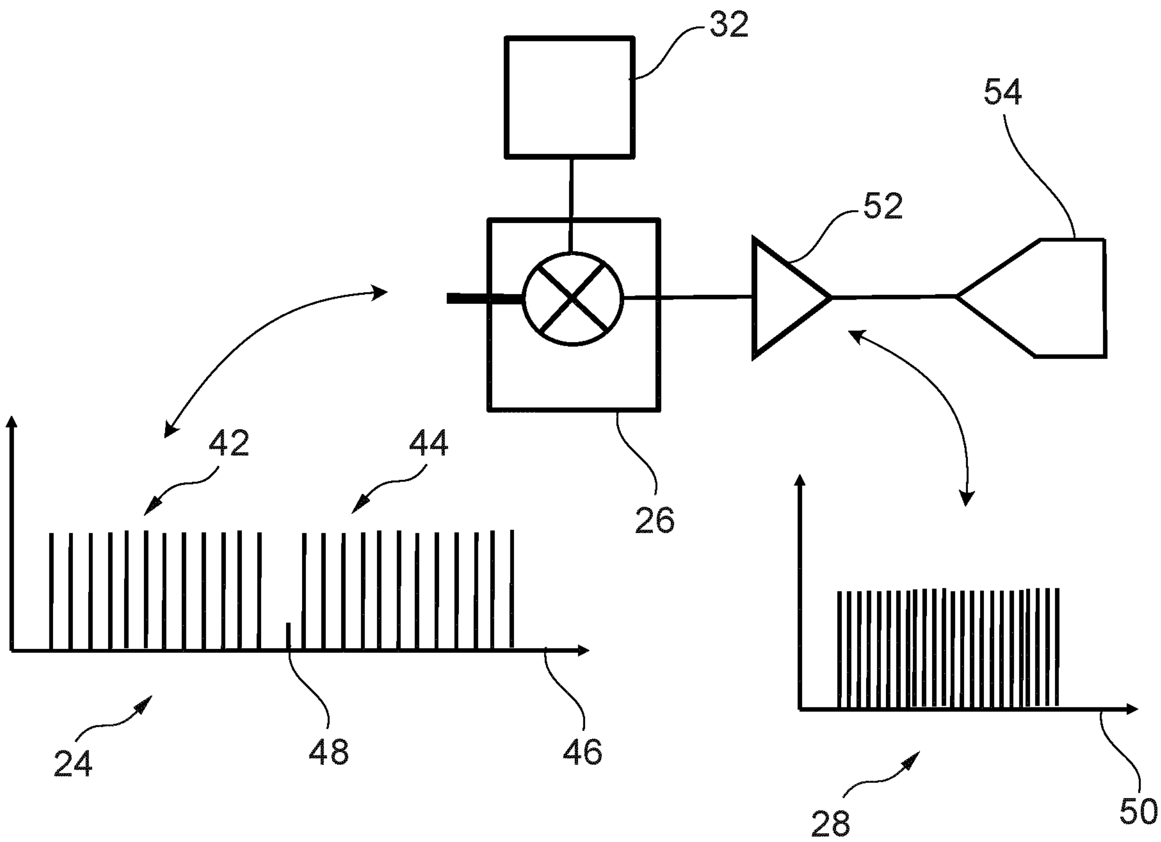
FIG. 3 shows a schematic representation of the process of generating an intermediate frequency signal during up-mixing when carrying out the method for detecting the spectrum by means of the spectrometer from FIG. 1.

Furthermore, the spectrometer 10 comprises an excitation and detection device 22 for exciting the molecular species that can be introduced into the excitation and detection device 22 with the excitation signal 20 and for detecting a background measurement signal 24 and a measurement signal produced by the excitation of the molecular species. The background measurement signal 24 is not shown in FIG. 1, but is shown in FIG. 3.

In addition, it can be seen from FIG. 1 that the spectrometer 10 comprises a down-converting mixer 26 for generating an intermediate frequency background signal 28 and an intermediate frequency signal 29 (not shown in FIG. 1, but shown in FIG. 3) on the basis of the detected background measurement signal 24 or the detected measurement signal.

In particular, a local oscillator 30 of the up-converting mixer 18 and a local oscillator 32 of the down-converting mixer 26 of the spectrometer 10 have different local oscillator frequencies 40, 48. In addition, in the spectrometer 10 of this exemplary embodiment, the excitation and detection device 22 is formed by a sample chamber 34 and two antennas 36. The sample chamber 34 is designed in such a way that the molecular species to be examined can be introduced into the sample chamber 34 as a gas.

Furthermore, the spectrometer 10 has a first analog-to-digital converter 64 for generating the spectrum 60 of the molecular species.

In addition, with reference to FIGS. 1 to 5, a method for detecting a spectrum by means of the spectrometer 10 is explained.

In the first step of the method, the polychromatic input signal 14 shown in FIG. 2 is generated by means of the arbitrary function generator 12. In the present case, this is an input signal 14 having a frequency comb in the frequency range of a first intermediate frequency 38. In the frequency domain, the input signal 14 thus has the shape of a comb, as shown in FIG. 2, wherein the teeth of the comb are formed by a plurality of equidistantly distributed, discrete frequency signals. The x-axis shown in FIG. 2 and all other x-axes in the figures are therefore frequency axes. The frequency range of the first intermediate frequency 38 extends from 0 to 100 MHz in this exemplary embodiment.

In a further step of the method, the excitation signal 20 is preferably generated by up-mixing the input signal 14 with the first local oscillator 30 having the first local oscillator frequency 40 by means of the up-converting mixer 18. The excitation signal 20 is formed with a lower sideband 42 and upper sideband 44 centered around the first local oscillator frequency 40 in a frequency range of the radio frequency 46. As can be seen in FIG. 2, the excitation signal 20 in the frequency domain thus comprises the two sidebands 42, 44 centered around the first local oscillator frequency 40. In the present case, the local oscillator frequency 40 is set at 100 GHZ, so that the excitation signal 20 extends in the frequency range of the radio frequency 46 from 100 GHz±100 MHz.

Subsequently, an empty measurement is first carried out-that is to say, a measurement in which the molecular species has not yet been introduced into the excitation and detection device 22. Thus, after the excitation signal 44 has been coupled into the molecular-species free excitation and detection device 22 of the spectrometer 10, the background measurement signal 24 shown in FIG. 3, produced by the excitation and detection device 22, is generated in a subsequent step of the method. The background measurement signal 24 is then down-mixed by means of the down-converting mixer 26, thereby generating an intermediate frequency background signal 28.

The background measurement signal 24 is a radio-frequency signal, as is the case for the excitation signal 44. However, since a second local oscillator frequency 48 of the local oscillator 32 of the down-converting mixer 26 is different from the first local oscillator frequency 40, the down-mixing of the background measurement signal 24 causes the intermediate frequency background signal 28 to be formed in the frequency range of a second intermediate frequency 50, substantially by interlacing the lower sideband 42 and the upper sideband 44 of the excitation signal 20. Due to the different frequencies of the first and second local oscillator 30, 32, an offset is produced in the down-mixing process, so that in the present case, the individual frequency peaks of the upper and lower sidebands 42, 44 of the frequency comb alternate in the intermediate frequency background signal 28 after down-mixing.

In the exemplary embodiment, the second local oscillator frequency 48 is at 100.0005 GHz, so that by down-mixing the background measurement signal 24 the intermediate frequency background signal 28 is generated in the frequency range of a second intermediate frequency 50 of 0-100 MHz.

In addition, in the exemplary embodiment, the intermediate frequency background signal 28 is amplified by the amplifier 52 and supplied to the second analog-to-digital converter 54. The second analog-to-digital converter 54 digitizes the intermediate frequency background signal 28, within a time interval of 1 ms.

On the basis of the digitized intermediate frequency background signal 28, a cancelation signal 56 is generated by means of the arbitrary function generator 12 in a further step of the method. The cancelation signal 56, shown in FIG. 4, is of such a form that it is phase-shifted by 180 degrees with respect to the intermediate frequency background signal 28, which as just described was generated with a molecular-species free excitation and detection device 22.

As soon as the empty measurement has been carried out, the process is repeated, wherein the molecular species is introduced into the excitation and detection device 22. Thus, after the excitation signal 44 has been coupled into the excitation and detection device 22 of the spectrometer 10, in a subsequent step of the method the measurement signal produced by the excitation of the molecular species present in the excitation and detection device 22 is detected with the excitation and detection device 22. Analogous to the background measurement signal 24, the measurement signal is then down-mixed by means of the down-converting mixer 26, thereby generating the intermediate frequency signal 29 (see FIG. 4).

Figure 4:
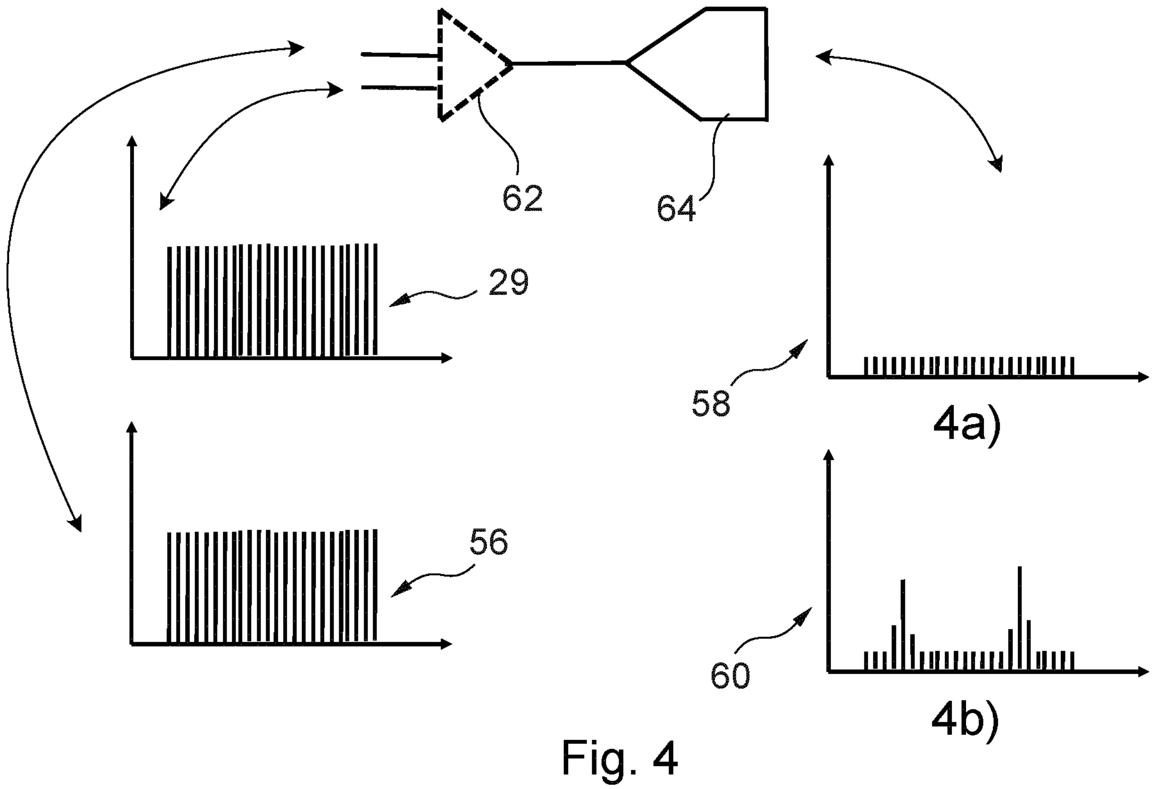
FIG. 4 shows a schematic representation of the process of summing the intermediate value signal from FIG. 3 with a cancelation signal, when carrying out the method for detecting the spectrum by means of the spectrometer from FIG. 1.

In the following step of the method, for detecting the spectrum the intermediate frequency signal 29 is summed with the cancelation signal 56, the sum signal is amplified by means of an amplifier 62 and supplied to the first analog-to-digital converter 64, as shown in FIG. 4.

If—as shown in FIG. 4*a*)—no molecular species was retained in the excitation and detection device 22 when detecting the spectrum 58, the cancelation signal 56 would be canceled out during the step of summing the cancelation signal 56 with the intermediate frequency signal 29, since the intermediate frequency signal 29 in this case would be identical to the intermediate frequency background signal 28. If, on the other hand—as shown in FIG. 4*b*)—the molecular species is retained in the excitation and detection device 22 when detecting the spectrum 60, the signals of the molecular species remain behind after summation of the cancelation signal 56 with the intermediate frequency signal 29.

Figure 5:
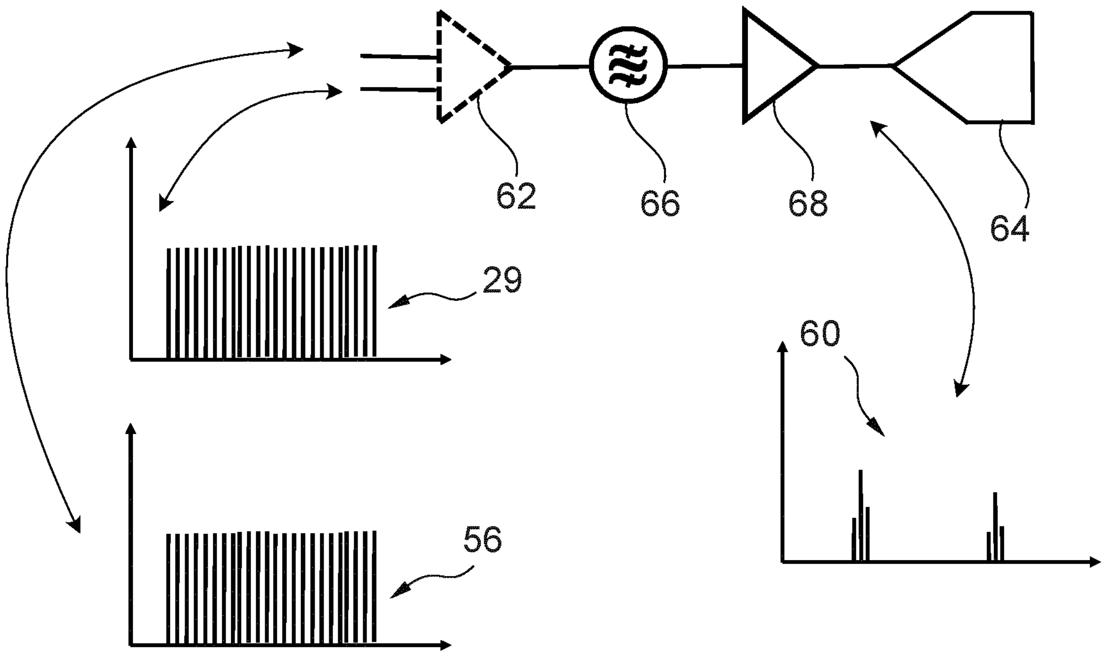
FIG. 5 shows a schematic representation of the process of demodulation, when carrying out the method for detecting the spectrum, according to an embodiment.

In the method, thus, by summing the cancelation signal 56 with the intermediate frequency signal 29, a sum signal is generated which is amplified by means of the amplifier 62 shown in FIGS. 1, 4 and 5. The spectrum 58, 60 is finally detected by digitizing the amplified sum signal by means of the first analog-to-digital converter 64 (see FIG. 1).

FIG. 5 also schematically illustrates the demodulating process. For this purpose, the spectrometer 10 in this exemplary embodiment has a bandpass filter 66, which is connected between the amplifier 62 and the first analog-to-digital converter 64. In addition, the spectrometer 10 has a further amplifier 68 between the bandpass filter 66 and the first analog-to-digital converter 64. For the frequency modulation, each peak of the frequency comb is modulated with a separate modulation frequency when generating the polychromatic input signal 14. Accordingly, the spectrum of the molecular species 60 can be obtained by demodulation of the amplified sum signal. The actual demodulation takes place via a corresponding modulation of the analog cancelation signal 56 and by a frequency analysis of the digitized signal 60. In other words, the demodulation takes place after the digitization of the signal—that is, after obtaining the digitized signal 60—and is effected by a corresponding modulation of the cancelation signal 56 in conjunction with the modulation of the input signal 14 and/or excitation signal 20, by further processing the difference signal of the intermediate frequency signal 29 and the cancelation signal 56. The signal detection by means of modulation/demodulation is preferably based on the principle of the superheterodyne method, in which the signal is detected by mixing it with a reference frequency—this is preferably in the audio range in this case.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 spectrometer
12 arbitrary function generator
14 input signal
16 digital-to-analog converter
18 up-converting mixer
20 excitation signal
22 excitation and detection device
24 background measurement signal
26 down-converting mixer
28 intermediate frequency background signal
29 intermediate frequency signal
30 first local oscillator, local oscillator of the up-converting mixer
32 second local oscillator, local oscillator of the down-converting mixer
34 sample chamber
36 antenna
38 first intermediate frequency
40 first local oscillator frequency, local oscillator frequency of the up-converting mixer
42 lower sideband
44 upper sideband
46 radio frequency
48 second local oscillator frequency, local oscillator frequency of the down-converting mixer
50 second intermediate frequency
52 amplifier
54 second analog-to-digital converter
56 cancelation signal
58 spectrum without molecular species in the excitation and detection device
60 spectrum with molecular species in the excitation and detection device
62 amplifier
64 first analog-to-digital converter
66 bandpass filter
68 additional amplifier

The invention claimed is:

1. A method for detecting a spectrum of a molecular species, comprising the steps of:
- generating an analog polychromatic excitation signal in a radio frequency range,
- coupling the excitation signal into an excitation and detection device to generate a background measurement signal and/or to excite the molecular species introduced into the excitation and detection device,
- detecting the analog background measurement signal produced by the excitation and detection device and/or detecting an analog measurement signal produced by the excitation of the molecular species introduced into the excitation and detection device using the excitation and detection device,
- generating an analog cancelation signal via an arbitrary function generator taking into account the detected background measurement signal, or generating the analog cancelation signal via the arbitrary function generator taking into account the detected measurement signal, the cancelation signal being such that it is phase-shifted at least proportionally by 180 degrees with respect to a detectable analog background signal,
- generating a sum signal, taking the cancelation signal and the measurement signal into account,
- amplifying the sum signal using an amplifier, and
- detecting the spectrum of the molecular species by digitizing the amplified sum signal via a first analog-to-digital converter.

2. The method as claimed in claim 1, wherein the step of generating the analog polychromatic excitation signal in the radio frequency range comprises generating an excitation signal in the form of a frequency comb.

3. The method as claimed in claim 1, wherein the step of generating the analog cancelation signal via the arbitrary function generator taking into account the detected background measurement signal comprises the steps of:
- amplifying the analog background measurement signal detected by the excitation and detection device via an amplifier, and
- digitizing the background measurement signal amplified by the amplifier via a second analog-to-digital converter,
- and wherein the analog cancelation signal is phase-shifted by 180 degrees with respect to the analog background measurement signal detected by the excitation and detection device.

4. The method as claimed in claim 1, wherein the step of generating the analog cancelation signal via the arbitrary function generator taking into account the detected measurement signal comprises the steps of:
- amplifying the analog measurement signal detected by the excitation and detection device via an amplifier,
- digitizing the measurement signal amplified by the amplifier via a second analog-to-digital converter, and
- identifying background regions in the digitized measurement signal,
- and wherein the analog cancelation signal is phase-shifted by 180 degrees, at least in the regions of the analog background measurement signal, which can be detected by the excitation and detection device, corresponding to the background regions.

5. The method as claimed in claim 1, wherein the step of generating the sum signal taking into account the cancelation signal and the measurement signal, comprises summing the cancelation signal with the analog measurement signal detected by the excitation and detection device.

6. The method as claimed in claim 1, wherein the step of generating the analog polychromatic excitation signal in the radio frequency range comprises the steps of:
- generating a polychromatic input signal via the arbitrary function generator, and
- generating the analog polychromatic excitation signal by up-mixing the input signal via an up-converting mixer with a first local oscillator having a first local oscillator frequency,
- and wherein the polychromatic excitation signal in the radio frequency range comprises a lower sideband and an upper sideband which are centered around the first local oscillator frequency.

7. The method as claimed in claim 6, wherein the step of generating the polychromatic input signal via the arbitrary function generator comprises generating an input signal in the form of a frequency comb in the frequency range of a first intermediate frequency.

8. The method as claimed in claim 1, wherein the step of generating the analog cancelation signal via the arbitrary function generator taking into account the detected background measurement signal comprises the steps of:

generating an intermediate frequency background signal, by down-mixing the analog background measurement signal detected by the excitation and detection device, via a down-converting mixer with a second local oscillator having a second local oscillator frequency, amplifying the generated intermediate frequency background signal via an amplifier, and digitizing the intermediate frequency background signal amplified by the amplifier via a second analog-to-digital converter, and wherein the analog cancelation signal is phase-shifted by 180 degrees with respect to the intermediate frequency background signal generated by the down-converting mixer.

9. The method as claimed in claim 1, wherein the step of generating the analog cancelation signal via the arbitrary function generator, taking into account the detected measurement signal, comprises the steps of:

generating an intermediate frequency background signal, by down-mixing the analog background measurement signal detected by the excitation and detection device via a down-converting mixer, with a second local oscillator having a second local oscillator frequency, amplifying the generated intermediate frequency measurement signal via an amplifier, digitizing the intermediate frequency measurement signal amplified by the amplifier, via a second analog-to-digital converter, and identifying background regions in the digitized intermediate frequency measurement signal, and wherein the analog cancelation signal is phase shifted by 180 degrees, at least in the regions of the intermediate frequency background signal, which can be generated by the down-converting mixer, corresponding to the background regions.

10. The method as claimed in claim 1, wherein the step of generating the sum signal taking into account the cancelation signal and the measurement signal, comprises summing the cancelation signal with the intermediate frequency measurement signal generated by the down-converting mixer.

11. The method as claimed in claim 1, wherein the step of generating the analog polychromatic excitation signal in the radio frequency range comprises generating an excitation signal in the form of a frequency comb, wherein each peak of the frequency comb is modulated with a separate modulation frequency, and wherein the step of detecting the spectrum of the molecular species by digitizing the amplified sum signal via the first analog-to-digital converter comprises detecting the spectrum of the molecular species by demodulating the amplified sum signal and digitizing the demodulated signal.

12. A spectrometer for detecting a spectrum of a molecular species, comprising:

an excitation and detection device, wherein the excitation and detection device is designed to couple an excitation signal into the excitation and detection device and to detect an analog background measurement signal and/or analog measurement signal, an arbitrary function generator, wherein the arbitrary function generator is designed to generate an analog cancelation signal, taking into account the detected background measurement signal or measurement signal, a first analog-to-digital converter for generating the spectrum of the molecular species, and a second analog-to-digital converter, wherein a) the arbitrary function generator is designed to generate the excitation signal, the second analog-to-digital converter is designed to receive the measurement signal and/or background measurement signal, and wherein the spectrometer is designed in such a way that the analog cancelation signal is phase-shifted by 180 degrees with respect to the analog background measurement signal detected by the excitation and detection device, or b) the spectrometer comprises an up-converting mixer with a first local oscillator having a first local oscillator frequency and a down-converting mixer with a second local oscillator having a second local oscillator frequency different from the first local oscillator frequency, wherein the arbitrary function generator is designed to generate an input signal, the up-converting mixer is designed to generate the excitation signal from the input signal, the down-converting mixer is designed to generate an intermediate frequency background signal from the detected analog background measurement signal and to generate an intermediate frequency measurement signal from the detected analog measurement signal, the second analog-to-digital converter is designed to receive the intermediate frequency measurement signal and/or intermediate frequency background signal, and wherein the spectrometer is designed in such a way that the analog cancelation signal is phase-shifted by 180 degrees with respect to the intermediate frequency background signal generated by the down-converting mixer.

13. The spectrometer as claimed in claim 12, wherein the spectrometer is designed according to the features a) and wherein the spectrometer is designed such that to detect the spectrum, a sum signal can be generated from the cancelation signal and the analog measurement signal, which can be digitized by the first analog-to-digital converter after amplification via an amplifier, or wherein the spectrometer is configured according to the features b) and wherein the spectrometer is designed such that to detect the spectrum, a sum signal can be generated from the cancelation signal and the intermediate frequency signal, which can be digitized by the first analog-to-digital converter after amplification via an amplifier.

14. The spectrometer as claimed in claim 12, wherein the spectrometer comprises a demodulator and is designed in such a way that to detect the spectrum, a sum signal can be generated from the cancelation signal and the intermediate frequency signal or from the cancelation signal and the analog measurement signal, which can be demodulated by the demodulator after amplification via an amplifier.

* * * * *